Feb. 20, 1968   C. L. CRUSE, JR   3,369,888
TREATMENT AND REDUCTION OF PELLETIZED IRON ORES
Filed June 1, 1965
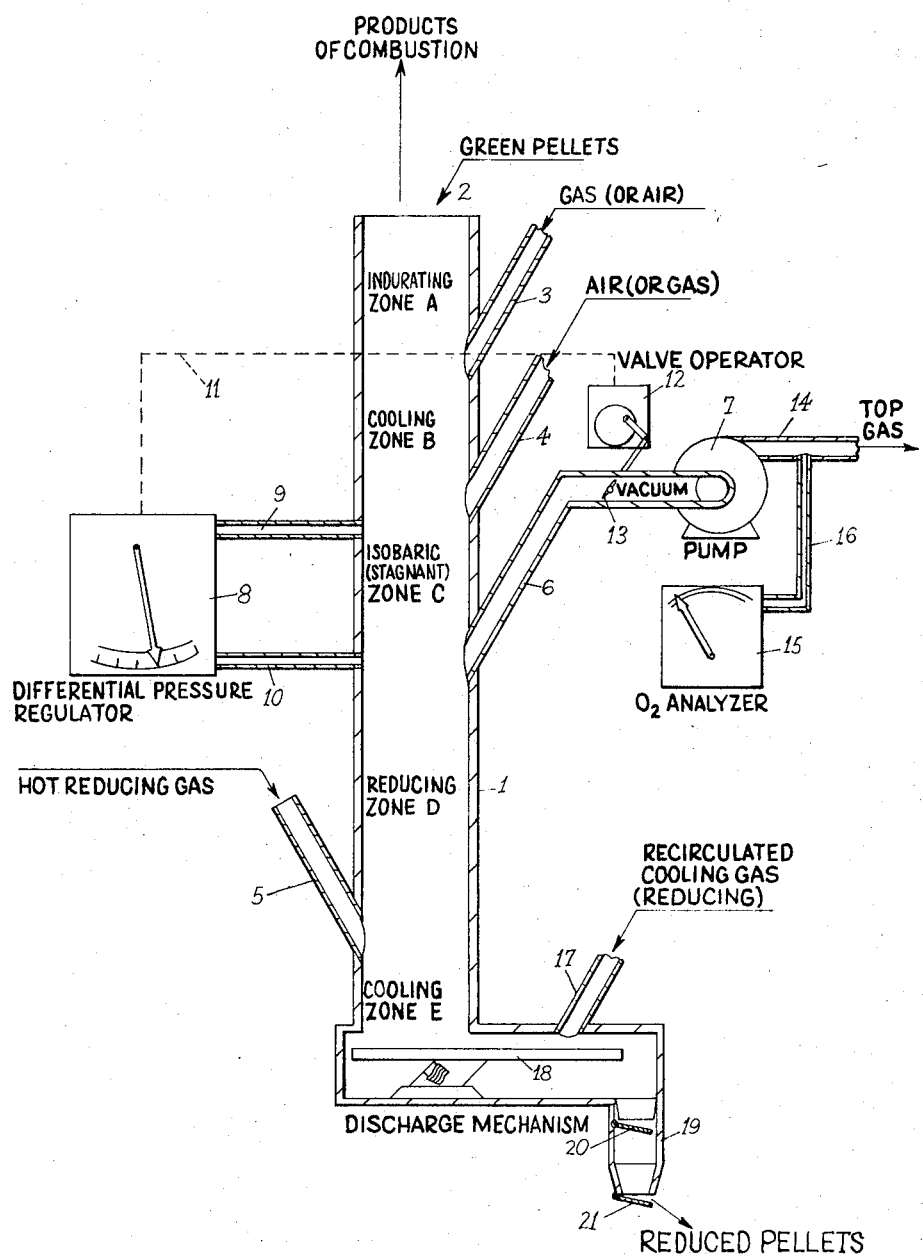
INVENTOR
CLYDE L. CRUSE, JR.,
BY *Yungblut, Melville, Strasser and Foster*
ATTORNEYS United States Patent Office
3,369,888
Patented Feb. 20, 1968

3,369,888
TREATMENT AND REDUCTION OF PELLETIZED IRON ORES
Clyde L. Cruse, Jr., Middletown, Ohio, assignor to Armco Steel Corporation, Middletown, Ohio, a corporation of Ohio
Filed June 1, 1965, Ser. No. 460,368
8 Claims. (Cl. 75—34)

ABSTRACT OF THE DISCLOSURE

This invention relates to the treatment and reduction of pelletized iron ores in a shaft furnace, and includes the steps of heating green pellets by direct flame reduction in an upper indurating zone to harden the pellets, subjecting the pellets in a lower reducing zone to a counter-current flow of hot reducing gases, introducing cool reducing gases into a lower zone of the furnace which by heat exchange cools the reduced pellets and preheats the reducing gases. Heated reducing gases are withdrawn at a point below the indurating zone, and a stagnant zone is maintained between the reducing and indurating zones.

---

It has hitherto been suggested that pellets of beneficiated iron ores such as taconite or similar ore substances could be economically subjected to gaseous reduction in the shaft furnace for the production of iron capable of being further refined in an electric furnace, open hearth furnace or in other ways. An apparatus and procedure for this purpose is set forth in the copending applications of William E. Marshall, Ser. No. 379,282 entitled, "The Production of Iron from Pelletized Iron Ores," filed June 30, 1964, and Ser. No. 384,373 entitled, "Gaseous Reduction of Pelletized Iron Ores," filed July 22, 1964. These copending applications are relied upon for teachings concerning the generation of reducing atmospheres and the renewal of the reducing potential of such atmospheres after periods of interaction with the pelletized iron ores. These copending applications belong to the assignee of this case.

With the depletion of sources of lump iron ores of high quality and suitable for use in blast furnaces, a great deal of work has been done in the beneficiating of lower grade iron ores, which are plentiful. While the present invention is not limited to their use, the taconites are an example of such iron ores. The taconites constitute a relatively low grade of iron ore, high in gangue materials such as silica and alumina. Beneficiation is required if these lower grade ores are to be used, and they must also be put into a physical condition which will permit their use in a smelting furnace such as the blast furnace.

In the beneficiating operation, the taconites are first crushed to a very finely divided condition. The iron oxide in them is, at least in part, magnetic, and this enables the ores to be beneficiated by the removing of the gangue materials. The finely divided taconite is passed over a magnetic roll separator, and there is recovered a finely divided ore derivative containing generally from about 62% to about 69% of iron. Thus, if the beneficiated product contains 69% of iron in the form of $Fe_3O_4$, the percentage of gangue material will be approximately 5%. Similar beneficiated products containing 62% of iron will have a gangue content of approximately 14%. It will be seen that the content of available iron in the beneficiated ore is high.

The beneficiated ore which is still in finely divided condition will be formed into pellets. This is done by adding the proper amount of moisture and tumbling the fine moist material in a drum. Pellets may be made in any desired size, but pellets having a diameter of about 3/8 of an inch have been found to work well in a shaft furnace. The term "green pellets" is used herein to denote the initial water-containing pellets which result from the agglomerating step.

The green pellets are relatively soft and weak, and it is necessary to harden or "indurate" them to give them sufficient strength for handling, shipping and storage. The green pellets are hardened by subjecting them to sufficient heat to drive off the water used in the agglomeration step, and to bring about an incipient sintering of the ore substances in the pellets. There are several ways in which pellets may be indurated including the treatment of them in a shaft furnace, or a treatment in a furnace having movable grates. The best results are secured when the green pellets are subjected to as little handling as possible before they are indurated. After induration, the pellets are still subject to damage in shipment and storage. Physical damage does not necessarily preclude the use of the beneficiated taconites in a smelting furnace of the shaft type; but a retention of the spherical form of the particles is highly desirable since otherwise the flow of the furnace gases upwardly through the charge in a shaft furnace will be non-uniform which results in poor gas-solid contact, more resistance, and contributes to irregular descent of the charge.

The hardening operation above described has always been carried on in a piece of equipment separate from the equipment in which the pellets will be reduced for the conversion of iron oxide into iron. The hardening or indurating equipment has had to be located adjacent the place where the pellets are initially formed since it is to all intents and purposes impossible to handle, store or ship green pellets. Generally, the indurating equipment will be located many miles from the smelting or reduction apparatus. The location of these latter operations will be determined in part at least, by the availability of other materials such as coke or natural gas for generating the reducing gases, and limestone which is used as a flux.

As indicated above, it has hitherto been suggested that the pellets may be reduced by direct gaseous reduction. This renders the operation more flexible since the reduction of the indurated ore pellets may be carried on at any place where a mobile fuel is available for the production of the reducing gases. The reduced pellets can be shipped anywhere so long as reasonable precautions are taken to minimize reoxidation. The fuel employed may be natural gas, various liquefied hydrocarbons such as butane or propane, powdered coal and the like. It is easier to transport a fuel than it is to transport the pellets of beneficiated taconite.

But it is a basic object of the present invention to make further savings and improvement in the efficiency of the process by providing means and a method whereby the induration or hardening of the green pellets can be carried on in the same apparatus as is used for their reduction. While the apparatus of this invention may be employed adjacent the location at which the taconite is beneficiated, this does not constitute a limitation on the invention because it is entirely possible to ship the finely divided, beneficiated taconite to any point of use of the reduced pellets, and to form green pellets adjacent the point of their use.

The main objects of this invention may be summarized as follows:

(a) To carry out the induration and reduction of iron oxide pellets in one continuous process and in one piece of equipment.

(b) To eliminate the handling of pellets between the induration apparatus and the reduction furnace, (c) To produce pellets which need be only as strong as is required for their intended purpose, (d) To utilize the heat put into the pellets during induration, whereby the efficiency of the process is substantially increased, and (e) To reduce the capital cost for indurating and reducing means for treating the pellets.

These and other objects of the invention which will be set forth hereinafter or will be apparent to one skilled in the art upon reading these specifications are accomplished by that procedure and through the use of that apparatus of which an exemplary embodiment will now be described.

Reference is made to the accompanying drawing which shows in diagrammatic form an apparatus suitable for the practice of the invention.

Briefly, in the practice of this invention green pellets of beneficiated ore are introduced into the top of a shaft furnace. In the upper portion of the furnace the green pellets are subjected to hardening and induration at whatever temperature is required to make them strong enough to descend the length of the furnace without undue decrepitation in the shaft and also withstand subsequent handling after removal from the furnace. The induration is accomplished by the combustion of a mobile fuel, preferably gas. The gas can be derived from a separate source if desired; but since reduction processes of the type referred to in the copending applications set forth above generally employ recirculation and the bleeding off of surplus combustible gases, the fuel required for the induration step may consist of or comprise recirculated top gas which is burned with air in the upper section of the shaft furnace.

The pellets then pass through a constant pressure zone and into a reducing zone during their descent through the shaft. The reduction is accomplished by a mixture of hot reducing gases and at least partially reheated, recirculated gas. The heat which has been put into the pellets during the induration step is in effect completely recovered. Part of it is used in preheating the combustion air for the induration secton, and part of it remains in the indurated pellets and is carried into the reduction section.

It will be understood that the degree of reduction will depend upon the intended use of the pellets. If, for example, the pellets are to be charged into a blast furnace along with coke and limestone, the percentage of iron oxide actually converted to metallic iron may be as low as 60%. Obviously the output of the furnance can be considerably increased under these circumstances. But if the pellets are to be used directly in an open hearth or electric melting furnace (either alone or with the addition of scrap or pig iron, or both), a reduction of about 95% of the oxide present in the pellets will be found desirable. In the last mentioned usages, high grade pellets which are low in gangue are desirable.

Turning now to the drawing, a furnace is diagrammatically shown as having a vertically elongated shaft portion 1. The specific construction of the furnace, i.e., whether or not the shaft is tapered to minimize hang-up or whether the shaft is insulated, do not constitute limitations on the general aspects of the invention. The green pellets are introduced into the upper part of the shaft 1, as indicated at 2; and then enter first an indurating zone marked A. While this indurating zone is indicated as short in vertical height, it will be understood that it may be as long as is necessary to produce the desired indurating effect. Gas or other mobile fuel is supplied to the indurating zone through a conduit 3. Air combustion is brought in at a lower point through a conduit or series of conduits 4.

In the indurating zone A the pellets will be highly heated by direct flame impingment and preferably heated to a temperature between about 1600° F. and about 2400° F. depending on the character of the ore used and the strength required. The pellets will then be heated to the point of incipient sintering but below any such temperature as would tend to join the pellets into a solid mass.

It is necessary to cool the indurated pellets to a temperature such that they will not stick together during their further descent through the shaft. Consequently the pellets next enter and traverse a cooling zone B. It will now be evident that the reason for the introduction of the air for combustion at a lower point in the shaft through the conduit 4 is to permit the air to effect the cooling of the pellets in the zone B. The cooling is carried on to such a temperature as will prevent sticking of the pellets to each other. This will depend upon the nature of the pellets themselves and the gangue which they contain. It will be understood that reduced metallic pellets will tend to stick together at lower temperatures than oxide pellets. With some pellets it is only necessary to reduce their temperature to a range of about 1500° to 1800° F. before the pellets enter a subsequent reducing zone. With other pellets it may be found advisable to lower the temperature to about 1000° to 1400° F. to prevent sticking. In either event, however, the heat abstracted from the pellets by the air entering through the conduit 4 is not lost but on the contrary increases the flame temperature in the zone A in which combustion takes place. The quantities of air and gas introduced through the conduits 3 and 4 are such as to cause complete combustion in the zone A.

Between the cooling zone B and a reducing zone subsequently described, there is a zone C which is called an isobaric or stagnant zone. One of the purposes of this zone is to prevent as much as possible the mixing of air and gas entering through the conduits 4 and 3 with the reducing gases later employed in the reducing zone. This is advisable because it is desired to recirculate and treat the reducing gases from the lower part of the shaft as generally taught in the copending application referred to above. Since combustion is intended to be complete in zone A, it is not desired to recirculate and treat the products of combustion passing out of the first zone. These gases are high in moisture and have substantially no reducing potential or fuel value.

The pressure in zone C is rigidly controlled so as to permit no flow or only an inconsequential flow of gas in either direction.

The reducing zone of the shaft furnace is marked D. Hot reducing gases enter through a conduit 5 and pass upwardly in this zone. For the above mentioned recirculation, treatment and prevention of mixing with the air and gas entering through conduits 4 and 3, the reducing gases are extracted through a conduit indicated at 6. This conduit is connected to a vacuum pump or fan 7 of sufficient capacity to withdraw from the shaft all of the reducing gases introduced into or below the reducing zone D. For purposes of control, a differential pressure regulator 8 is connected to spaced points along the length of the shaft by tubes 9 and 10. The measurement of the differential in pressure within the tubes 9 and 10 creates a signal in the differential pressure regulator 8. This signal is relayed by means indicated at 11 to a valve operating device 12 connected with a valve 13 in the conduit 6. Thus, the quantity of gas, hereinafter called "top gas," withdrawn from the shaft furnace through the conduit 6 can be so proportioned that there is no gas flow or only an insignificant gas flow through the zone C. Should there be a slight flow of the top gas in the upward direction, it will ignite upon reaching the air introduced through the conduit 4. Should there be a slight flow of gas in the downward direction in the stagnant zone C, air from the conduit 4 will burn some of the top gas in the zone D. Either of these conditions is undesirable and the purpose of the apparatus indicated is to control them so that these undesirable flows will be minimized to an acceptable level.

The top gas from the reducing zone, after having passed through the conduit 6 and the vacuum pump 7, enters a conduit 14 which is part of a recirculatory system. The recirculatory system is not shown in the drawing of this case but it may be or comprise either of the recirculatory systems described and claimed in the copending applications referred to herein. In general, the recirculatory system will comprise a cooling means which has the effect of condensing moisture in the top gas, this moisture being removed by a suitable separator. The reducing potential of the top gas may be sufficiently regenerated by the cooling aforesaid. However, it is possible to provide means in the recirculatory system to convert carbon dioxide into carbon monoxide or to regenerate hydrogen by the reaction of water and carbon monoxide. A gas analyzer 15 may be connected by a pipe 16 into the conduit 14 to monitor the extracted gases for oxygen content to enable the operator to control the pressure in the stagnant zone.

In any event, the recirculated gas which has had its reducing potential increased will be brought back and introduced into the lower part of the shaft via a conduit 17. It will be noted that the recirculated gas, which has been cooled, enters the shaft below the reducing zone D in a cooling zone E. The heat carried by the reduced pellets passing from the reducing zone D will be salvaged in the cooling zone E by heating up the recirculated reducing gases, making them more active. Preferably the cooling is carried on to the extent of lowering the temperature of the reduced pellets to below their air oxidation temperature.

It has been indicated above that hot reducing gases enter the reducing zone D through the conduit 5. These hot reducing gases may be derived from various sources including the partial combustion of a mobile fuel such as natural gas, the combustion being so controlled as to provide a large volume of reducing gases.

A rotating plate 18 may be used to control the speed at which the reduced pellets descend through the shaft and to feed the reduced pellets at a controlled rate to an outlet means 19 preferably provided with double gates 20 and 21 through which the reduced pellets may be removed for treatment or storage.

It is possible to introduce some natural gas or other methane bearing gas into the recirculated gas stream. A reformation reaction, catalyzed by the reduced pellets, can take place as the recirculated gases pass upwardly through the cooling zone E and the reducing zone D so as to increase the reducing potential of the gases.

In the practice of the invention, the green pellets may be fed in either wet or dry condition into the top of the shaft 1. It is preferred to feed them in the wet condition because this minimizes handling and eliminates the need for drying apparatus.

The gas and air inlets 3 and 4 may be interchanged, providing the gas mixture is sufficiently lean. In other words, it is desired to have a sufficient flow of gas through the cooling zone B while confining the combustion of the gas essentially to the indurating zone A.

Needless to say, thermocouples and other measuring devices may be set up along the length of the shaft furnace in accordance with good engineering practice.

If the temperature needed for the induration of the green pellets is not so high as to require cooling before reduction, it is possible to allow some of the top gas to pass up the shaft furnace into the induration zone and to supply the necessary air to burn it in that zone. This can be accomplished by manipulation of the pressure differential in the stagnant zone C.

Modifications may be made in the invention without departing from the spirit of it.

The embodiments of the invention in which an exclusive property or privilege is claimed are defined as follows:

1. A process of reducing beneficiated iron ores in pellet form which comprises the steps of:
   pelletizing a finely divided ore to form moist green pellets; passing the pellets so formed continuously through a shaft furnace;
   establishing an indurating zone in which the green pellets are heated by direct flame combustion to the extent of hardening the pellets sufficiently to permit their passage through the remainder of said shaft furnace without disintegration by passing a combustible gas mixture into said zone and burning it therein;
   establishing a first cooling zone following the indurating zone by passing gaseous substances through said first cooling zone essentially without combustion;
   introducing other gaseous substances into the indurating zone of such character that the commingling of the gaseous substances introduced into the first cooling zone and the other gaseous substances introduced into the indurating zone will, upon intermixture, produce combustion in said indurating zone;
   establishing a reducing zone in said shaft furnace in which the indurated pellets are subjected to reducing gases at high temperature by introducing into a lower part of said furnace reducing gases in counterflow to said pellets;
   maintaining a stagnant zone between said first cooling zone and said reducing zone to minimize gas exchange therebetween;
   measuring the pressures within the shaft at the beginning and at the end of said stagnant zone;
   withdrawing the reducing gases at the top of the reducing zone by pump means;
   controlling the effective operation of said pump means in accordance with the differential pressure measurements in the stagnant zone;
   and establishing a final cooling zone in said furnace by introducing a portion at least of the reducing gases into the shaft at a relatively low temperature whereby to recover the heat resident in the pellets by causing the pellets to heat up the said gases to a temperature suitable for reduction in the reducing zone, the said pellets as they enter the reducing zone retaining at least some of the heat imparted to them in said indurating zone of the shaft furnace.

2. The process claimed in claim 1 including the step of recirculating and treating the reducing gases withdrawn from the shaft at the top of the reducing zone at least for the condensation and withdrawal of moisture therefrom, whereby the reducing potential of the withdrawn gases is at least partially restored and whereby the recirculated gases attain a relatively low temperature and are reintroduced at the bottom of the furnace in the final cooling zone thereof.

3. The process claimed in claim 2 including the step of introducing into said reducing zone additional quantities of hot reducing gases derived from a source other than the source of said recirculated and cooled gases.

4. The process claimed in claim 3 wherein the action of the cool recirculated gases at the bottom of the said shaft is to lower the temperature of the reduced pellets to below the air oxidation temperature, and including the step of removing the reduced and cooled pellets from the bottom portion of the said shaft furnace.

5. The process claimed in claim 4 wherein the combustion in the said indurating zone is substantially complete combustion resulting in the formation of carbon dioxide and water and including the step of venting the gases from the said indurating zone to the outer atmosphere.

6. In apparatus for the purpose described:
   a vertically elongated shaft furnace having a plurality of successive treatment zones throughout its length;
   a first one of these treatment zones being an indurating zone in which green pellets of beneficiated ore are subjected to direct flame heating;
   means for supplying a combustible gaseous mixture to said indurating zone;
   a first cooling zone following said indurating zone;

means for introducing into said first cooling zone a gaseous substance which alone will not support combustion but will tend to cool pellets passing downwardly from said indurating zone to a temperature at which said pellets will not stick together;

means for introducing into said indurating zone a gaseous substance which when mixed with the gaseous substance introduced into said first cooling zone will support combustion in said indurating zone;

another zone in said shaft furnace being a reducing zone in which indurated pellets are subjected to the action of heated reducing gases;

a stagnant zone following said first cooling zone;

means for the maintenance of an isobaric condition in said stagnant zone for minimizing gaseous exchange between said first cooling zone and said reducing zone;

means at the top of said reducing zone for withdrawing said reducing gases from said shaft; and means at the bottom of said reducing zone for introducing hot reducing gases into said shaft furnace.

7. The structure claimed in claim 6, including means for effecting a differential measurement of pressures at each end of said stagnant zone, pump means for withdrawing gases from the top portion of said reducing zone, and means for controlling the withdrawal of said reducing gases in accordance with the said differential measurement.

8. The structure claimed in claim 7 including a second cooling zone at the bottom of said shaft furnace and means for introducing into said second cooling zone reducing gases at the temperature and flow volume such as to lower the temperature of said reduced pellets to below the air oxidation temperature.

References Cited
UNITED STATES PATENTS

| | | | |
|---|---|---|---|
| 1,448,340 | 3/1923 | Fleischer | 75—7 |
| 1,940,246 | 12/1933 | Clark et al. | 266—20 |
| 2,528,553 | 11/1950 | Royster | 75—34 |
| 2,609,288 | 9/1952 | Stuart | 75—35 |
| 2,873,183 | 2/1959 | Pike | 75—35 |
| 2,533,142 | 12/1950 | Royster | 75—5 |

BENJAMIN HENKIN, *Primary Examiner.*